Figure 1:
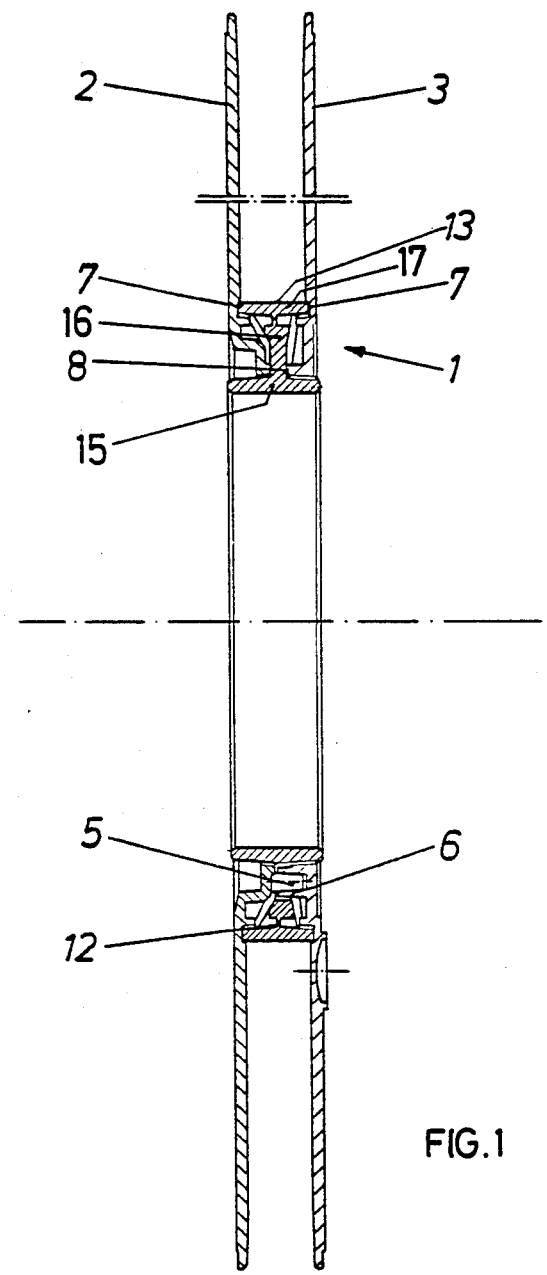

United States Patent [19]

Schmidts et al.

[11] Patent Number: 4,560,114
[45] Date of Patent: Dec. 24, 1985

[54] REEL FOR TAPE-LIKE MATERIAL, ESPECIALLY MAGNETIC TAPE

[75] Inventors: Kurt Schmidts, Kehl; Hans-Otto Feyh, Neuried; Max J. Mania, Willstaett, all of Fed. Rep. of Germany

[73] Assignee: BASF Aktiengesellschaft, Ludwigshafen, Fed. Rep. of Germany

[21] Appl. No.: 591,595

[22] Filed: Mar. 20, 1984

[30] Foreign Application Priority Data

Mar. 29, 1983 [DE] Fed. Rep. of Germany ... 8309239[U]

[51] Int. Cl.⁴ .......................................... B65H 75/18
[52] U.S. Cl. ..................................... 242/71.8; 242/77
[58] Field of Search ................... 242/71.8, 71.9, 118.4, 242/118.61, 118.7, 77, 77.3

[56] References Cited

U.S. PATENT DOCUMENTS

| | | | |
|---|---|---|---|
| 1,530,062 | 3/1925 | Thompson | 242/118.61 |
| 3,410,500 | 11/1968 | Elliott | 242/71.8 |
| 4,044,965 | 8/1977 | Posso | 242/71.8 |
| 4,052,020 | 10/1977 | Knox | 242/71.8 |
| 4,327,879 | 5/1982 | Tanny | 242/71.8 |

*Primary Examiner*—Leonard D. Christian
*Attorney, Agent, or Firm*—Keil & Weinkauf

[57] ABSTRACT

A reel for material of tape-like configuration, especially magnetic tape, comprises two side flanges which are rigidly connected together to form a flange unit, and a hub firmly clamped between said side flanges. Advantageously, an essentially continuous gap is provided between the flange unit and the hub to accommodate any radial deformation of the winding surface. The novel reel is particularly suitable for computer and video tapes which exert considerable compression on the hub when they are wound.

9 Claims, 5 Drawing Figures

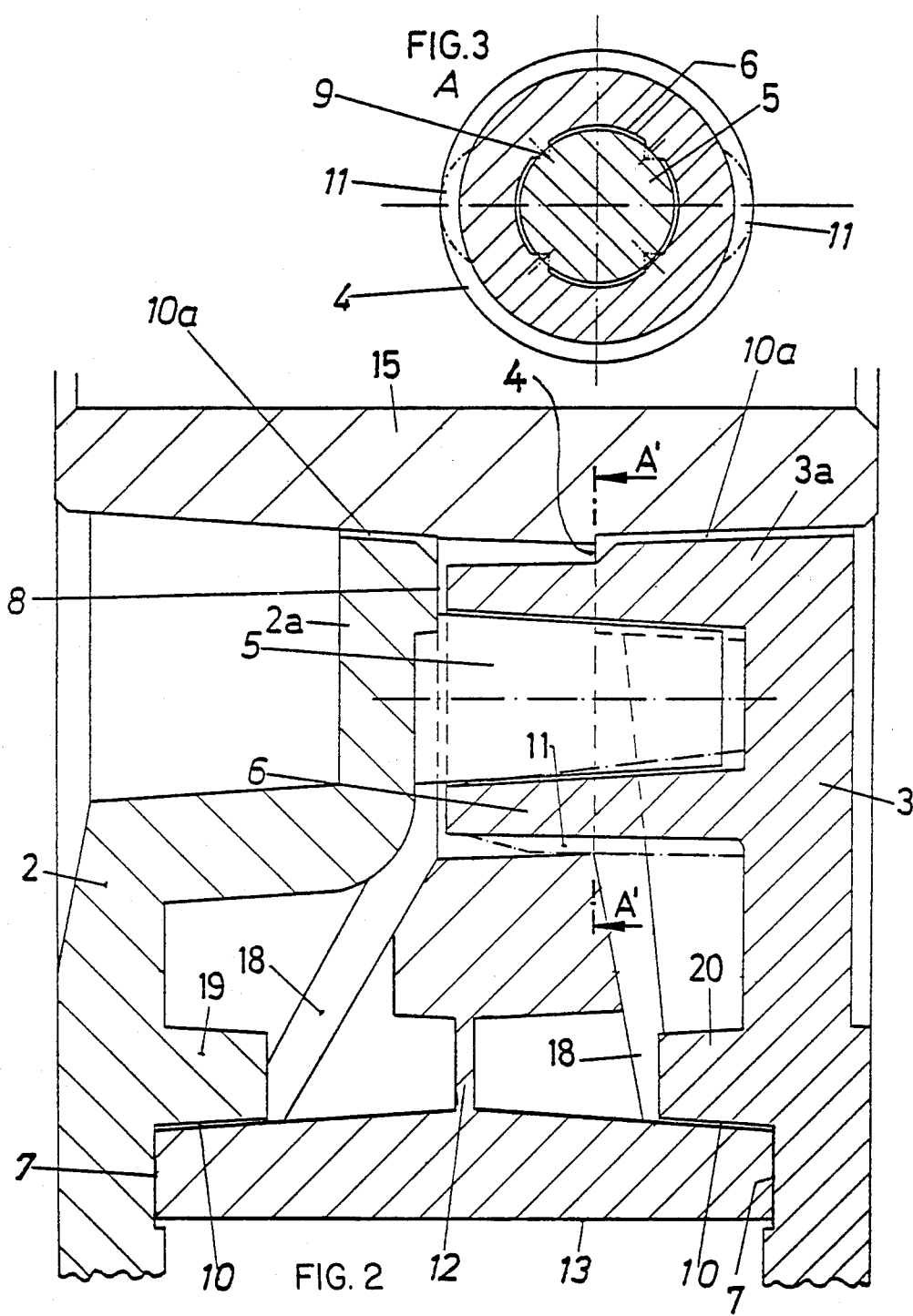

REEL FOR TAPE-LIKE MATERIAL, ESPECIALLY MAGNETIC TAPE

The present invention relates to a reel for material of tape-like configuration, especially magnetic tape, consisting of (a) an annular hub with an opening for the admission of the drive spindle of a tape transport, and a winding surface for the tape, and (b) two side flanges which are associated with the said hub.

U.S. Pat. No. 3,410,500 discloses a tape reel of this type in which the hub portion is provided with a plurality of spaced holes through which a corresponding number of slotted pin portions on one flange extend, the slots in the pin portions so coacting with matching projection means on the other flange that the pin portions are expanded outwardly into engagement with the walls of said spaced holes to provide a good physical interconnection between the flanges and the hub, a single structure thus being formed. In addition, the flanges are each provided with a concentric skirt portion, which skirt portions cooperate with one another and are bonded together; the inner periphery of the inner skirt portion is in turn bonded to the hub portion. In this reel construction, deformation of the winding surface inevitably results in deformation of the skirt portions and hence of the flanges themselves, which renders the reel completely useless.

In the case of the tape reel described in U.S. Pat. No. 4,044,965, the side flanges are connected to the hub portion by a plurality of annular welds, the driving ring with the winding surface being connected to the hub proper via a web and ribs, which is intended to eliminate the risk of flange distortion. However, a disadvantage of this prior art design is that the materials of construction of the flanges and hub portion must be matched to enable them to be welded together. As a result, the choice of materials is very limited. In the case of concentric annular welds, the forces which are generated when the hub portion loses its cylindricity whilst the tape is being wound are transmitted to the welds and hence to the large flat portions of the flanges, which results in the formation of cracks in the welded areas and in saucer-shaped buckling of the side flanges. Moreover, the hub portion is weakened by the spaces behind the driving ring with the winding surface and, owing to the presence of ribs connecting the said ring and the web, is caused to assume an angular shape when the compression exerted by the wound tape is unduly high, as a result of which the tape reel is rendered useless.

U.S. Pat. No. 4,327,879 describes a further tape reel in which the side flanges are each welded to the hub portion at 72 radial points, 48 at the periphery of the central part of the hub portion, and 24 adjacent to the driving ring with the winding surface. This tape reel has the same disadvantages as the aforementioned reel constructions and, in common with the reel which also comprises three welded-together parts, the disadvantage that true axial running can only be achieved at very great expense or not at all because the distance between the upper and lower edges of the driving ring and the flanges is determined by the welds.

An object of the present invention is to provide a dimensionally stable tape reel which can be produced economically and more simply.

We have found that this object is achieved with a reel for material of tape-like configuration, especially magnetic tape, consisting of (a) an annular hub with an opening for the admission of the drive spindle of a tape transport, and a winding surface for the tape, and (b) two side flanges associated with the hub, wherein the flanges are non-detachably connected together direct, and the hub is firmly held therebetween by clamping and/or frictional forces.

The tape reel of the invention exhibits very great dimensional stability, as a result of wich the tape-like material, which is usually based on a thermoplastic, can be reliably wound onto, and unwound from, the reel and stored thereon; this essentially precludes embossing, skew and wavy edges. The novel reel design has the advantage that the choice of materials for the flanges and hub is much larger, so that very strong materials of construction, such as glass-fiber-reinforced plastics, or light metals, can be used for the hub, regardless of the thermoplastic material employed for the flanges.

In an advantageous embodiment of the novel tape reel, at least one essentially continuous gap is provided between the hub and the unit formed by the two welded-together flanges, to accommodate any deformation of the winding surface brought about by the compression produced by the tape being wound on the hub. Consequently, any reduction in the diameter of the hub caused by such deformation can be tolerated and does not result in buckling of the flanges.

In a further advantageous embodiment, the flanges are connected together by a plurality of, especially 12 to 16, pairs of interlocking projections and holes, each projection being preferably welded into its corresponding hole.

In a preferred practical embodiment of the novel reel, the holes are arranged in socket members integral with the side flange, and the wall of each hole is provided with at least 2, especially 4, projection means for welding purposes. The reel can thus be manufactured in a simple manner by pressing the flanges together until they come up against the reference surfaces on the hub, and simultaneously effecting welding.

To achieve a good structural interconnection between the flange unit and the hub, it is in practice advantageous to provide the outside of each socket member with at least two projections which are arranged essentially symmetrically.

In an advantageous reel design, the hub has an I-shaped cross section and includes an inner flange and an outer flange with the winding surface, the two flanges being arranged in spatial relationship and connected by a web which has holes therein and comprises a thin portion which is at right angles to the winding surface. Deformation of the winding surface caused by the compression exerted by the wound tape is substantially prevented by the parts of the hub arranged radially inside the outer flange, which parts serve as supports for said outer flange.

In yet another advantageous embodiment of the reel, the parts of the hub and flanges constituting the central portion of the reel, when viewed in cross section, together form a caisson-like structure.

Further details of the invention are disclosed in the following description of the embodiments given by way of example and illustrated in the accompanying drawings, in which FIG. 1 is a diametrical section through a reel according to the invention, FIG. 2 is a partial cross-sectional view of the reel of FIG. 1, showing on a larger scale the central caisson-like structure formed by the associated hub and flange parts, and FIG. 3 is a cross-sectional view taken along line A'—A' of FIG. 2.

Referring now to FIG. 1, the annular hub 1 is made from a high-strength material, e.g., glass-fiber-reinforced ABS resin or another suitable glass-fiber-reinforced plastic, or from metal or a metal alloy. The hub 1 has an I-shaped cross section, as shown by the wide hatching, and includes an inner flange 15 bearing a thick web portion 16 which is connected to an outer flange 17 via a thin web portion 12. Web portion 16 is provided with a plurality of circular holes 4 to permit the passage of the interconnecting portions of the flanges. The outer periphery of outer flange 17 forms the winding surface 13 on which the tape-like material, particularly magnetic tape, is wound. The outer flange 17 is supported on the inner flange 15 and web portion 16 by an adequate number of radial ribs 18 (cf. FIG. 2).

Two side flanges 2 and 3 made of a suitable thermoplastic such as polystyrene or the like are arranged on hub 1. As shown in particular in FIG. 2, flanges 2 and 3 are of different shape, but are so designed that they can be fitted together. Flange 2 has a plurality of offset portions with integral lugs 5, and flange 3 has a corresponding number of integral socket members 6, whose inner walls are each provided with a plurality of, advantageously four, axially extending welding ribs 9 (cf. FIG. 3). At least two projections 11, which preferably lie diametrically opposite one another, are provided on the outside of each socket member 6. These projections 11 are so arranged and dimensioned that the socket members 6 snugly fit in the circular holes 4 in hub 1. FIG. 3 shows how the lug 5, socket member 6 and welding ribs 9 are arranged relative to hole 4 in hub 1. A plurality of, advantageously 12 to 16, pairs of lugs and socket members and a corresponding number of circular holes 4 are provided in order to achieve a sufficiently strong, central-symmetrical connection between the side flanges 2 and 3 which are fastened together direct by welding, particularly ultrasonic welding, to form a single unit. However, any suitable kind of adhesive and any kind of inseparable interengaging connecting means may be employed, instead of welding, to fasten the flanges together. The shape of lugs 5 and socket members 6 is limited solely by the method of manufacture. Theoretically a large number of pairs of mating shaped members can be employed, the number being determined by the members' respective dimensions and the maximum permissible number of holes in the hub. It should be stressed that in the reel design according to the present invention the flanges are not welded to the hub at any point. After flanges 2 and 3 have been pressed together so that they come to bear against the reference surfaces on hub 1, i.e. against the end faces 7 of outer flange 17 and the annular surface 8 on web portion 16, they are precisely aligned relative to the hub and hence to each other without being fastened to the hub in any way, and the hub is firmly held therebetween by frictional clamping forces which should be of such a magnitude that rotation of the hub 1 is prevented. These forces can be increased by appropriately designing the surfaces of the flanges and hub which make contact with one another. Flanges 2 and 3, which, as mentioned above, are made of a suitable thermoplastic, can be produced by any suitable manufacturing process, preferably by injection molding. It is of course also possible to produce the flanges from a suitable metal, light metal or alloy thereof. If desired, flanges made of plastic can be provided with metal or light metal reinforcements.

Flanges 2 and 3 are connected together at lugs 5 and socket members 6 by welding. In the case of thermoplastics, it is in practice advantageous to effect welding by ultrasounds. In the case of metals, suitable methods are electric welding, oxyacetylene welding or laser beam welding.

Web portion 12 is provided to afford better resistance to the compressive forces which act radially on the winding surface 13 and are produced by the tape wound thereon under tension. The other parts of the hub participate in the support function of said web portion, as a result of which deformation of the winding surface is substantially avoided. To prevent said radially acting compressive forces, in the event that they bring about a reduction in the diameter of the hub, from having a direct effect (buckling) on the flanges 2 and 3, gaps 10 are provided between the outer flange 17 and annular projections 19 and 20. It may be advantageous to also provide gaps 10a between the inner flange 15 of hub 1 and flange portions 2a and 3a. Gaps 10 and 10a are essentially continuous and serve to accommodate any radial deformation. If desired, gaps 10 and 10a may be filled with a suitable deformable material.

Gaps 10 and 10a should have an appropriate width which is determined by the particular materials of construction used. A gap width of from about 0.05 to about 0.1 mm has proved to be advantageous for computer tape reels with a diameter of from about 12 to 27 cm and having a hub made of glass-fibered-reinforced ABS resin, and polystyrene flanges.

Reference surfaces 7 and 8 and the surfaces on either side of the gaps 10 and 10a can be produced with sufficient accuracy by the usual manufacturing techniques, e.g. injection molding in the case of thermoplastics, so that a dimensionally stable reel can be obtained simply and reliably by welding the flanges 2 and 3 together, without there being any need to employ any kind of means for fastening the flanges to the hub 1. Owing to the special design of the inner peripheral portions of the flanges 2 and 3, and of the hub 1, the compressive forces exerted by the wound tape are optimally distributed and accomodated.

While the invention has been particularly shown and described with reference to the foregoing embodiments, it will be understood by the skilled artisan that any alterations or modifications that may become apparent to him are also intended to be covered by the appended claims.

We claim:

1. A reel for material of tape-like configuration, especially magnetic tape, consisting of (a) an annular hub with an opening for the admission of the drive spindle of a tape transport, and a winding surface for the tape, and (b) two side flanges associated with the hub, wherein the reel comprises means for non-detachably fastening said side flanges to each other rather than to the hub, and means for firmly holding the hub to the two flanges by mere frictional clamping forces, said first-mentioned means including structure for welding said flanges to each other to form a welding unit.

2. A reel for material of tape-like configuration, especially magnetic tape, consisting of (a) an annular hub with an opening for the admission of the drive spindle of a tape transport, and a winding surface for the tape, and (b) two side flanges associated with the hub, wherein the reel comprises means for non-detachably fastening said side flanges to each other rather than to the hub, and means for firmly holding the hub to the two flanges by mere frictional clamping forces, said second-mentioned means including a pair of annular surfaces on each said flange and a pair of inner and outer side surfaces on the hub for clamping said hub between said two flanges.

3. A tape reel as claimed in claim 1, wherein at least one essentially continuous gap is provided between the hub and the unit formed by the welded-together flanges to accommodate any deformation of the winding surface brought about by the compressive forces which act radially thereon and are produced by the wound tape.

4. A reel for material of tape-like configuration, especially magnetic tape, consisting of (a) an annular hub with an opening for the admission of the drive spindle of a tape transport, and a winding surface for the tape, and (b) two side flanges associated with the hub, wherein the reel comprises means for non-detachably fastening said side flanges to each other rather than to the hub, and means for firmly holding the hub to the two flanges by mere frictional clamping forces, and wherein the hub has an I-shaped cross-section and includes an inner flange, an outer flange and web means, the two flanges being arranged in spatial relationship and connected by said web means, said web means having apertures therein and comprising a thin portion which is at right angles to the winding surface.

5. A reel for material of tape-like configuration, especially magnetic tape, consisting of (a) an annular hub with an opening for the admission of the drive spindle of a tape transport, and a winding surface for the tape, and (b) two side flanges associated with the hub, wherein the reel comprises means for non-detachably fastening said side flanges to each other rather than to the hub, and means for firmly holding the hub to the two flanges by mere frictional clamping forces, said first-mentioned means including interengaging lugs and holes on said side flanges, respectively.

6. A tape reel as claimed in claim 1, wherein the parts of the hub and side flanges constituting the central portion of the reel, when viewed in cross section, are designed to form a caisson-like structure.

7. A tape reel as claimed in claim 5, wherein one of said side flanges includes socket members integral with said flange, in which socket members said holes are formed, each said hole having a wall in which at least two welding ribs are provided.

8. A tape reel as claimed in claim 7, wherein the outside of each said socket member is provided with at least two projections which are arranged essentially symmetrically.

9. A tape reel as claimed in claim 7, wherein said side flanges are welded to each other ultrasonically by means of said welding ribs.

* * * * *